(No Model.)
C. ASHURST.
FILTER.
No. 542,914.  Patented July 16, 1895.
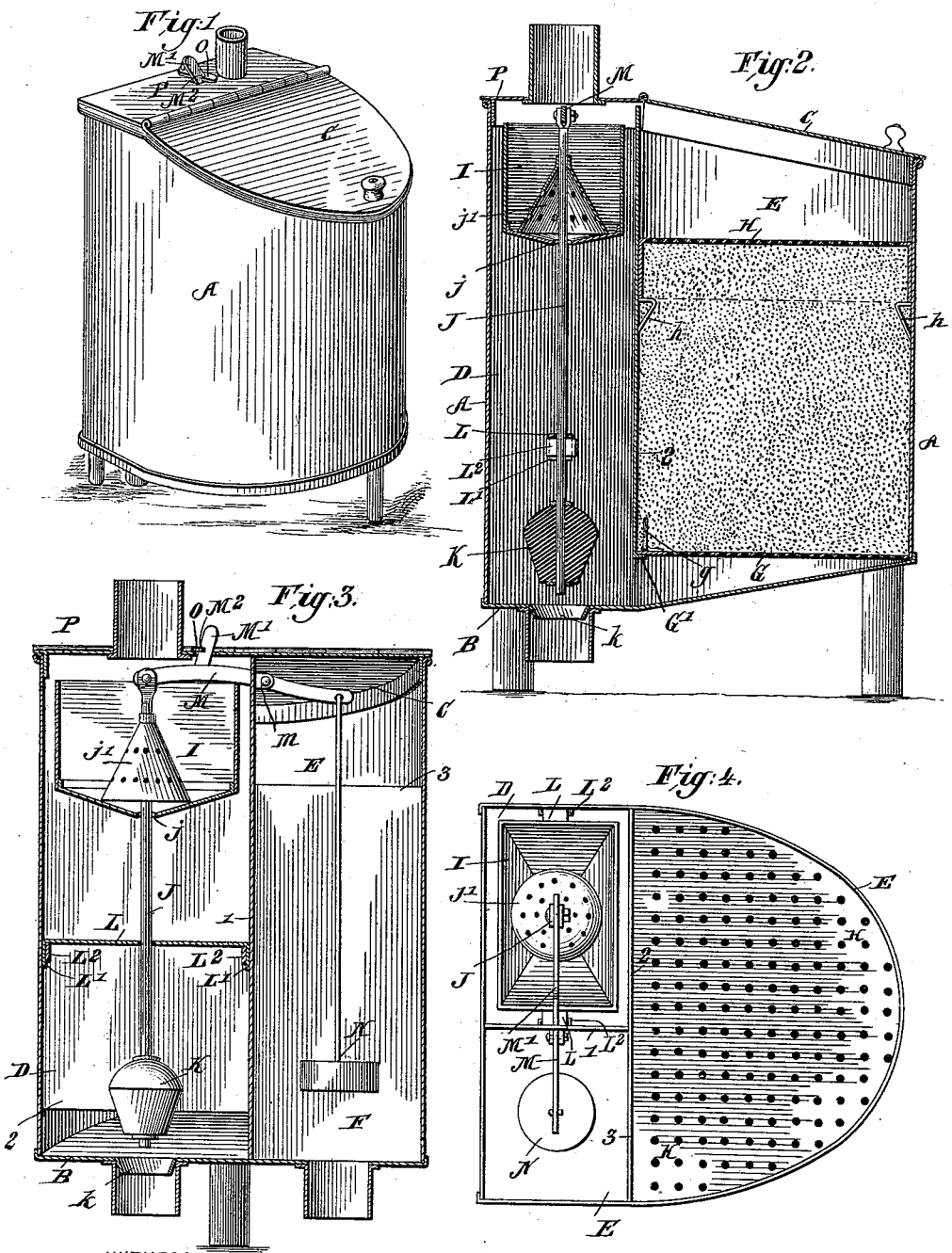
WITNESSES:
Fred G. Dieterich
P. B. Turpin
INVENTOR
Charles Ashurst
BY Munn & Co.
ATTORNEYS.

UNITED STATES PATENT OFFICE.

CHARLES ASHURST, OF PARIS, KENTUCKY, ASSIGNOR OF TWO-THIRDS TO EPHRIAM B. JANUARY AND NICHOLAS CONNELL, OF SAME PLACE.

FILTER.

SPECIFICATION forming part of Letters Patent No. 542,914, dated July 16, 1895.

Application filed April 1, 1895. Serial No. 544,036. (No model.)

*To all whom it may concern:*

Be it known that I, CHARLES ASHURST, of Paris, in the county of Bourbon and State of Kentucky, have invented a new and useful Improvement in Filters, of which the following is a specification.

My invention is an improvement in filters, and particularly in filters adapted for use in connection with downspouts of buildings, and has among other objects to provide improved constructions by which the first portion of water passing into the filter will be discharged to a suitable waste pipe or way, while the succeeding portions of water will pass through the filtering material into the cistern or other receptacle.

The invention has for further objects to provide for readily cleaning the filter when the rain ceases by draining therefrom all the water contained in the filtering material and discharging same through the waste-outlet, thus cleansing the filtering material and washing off the bottom of the filter-tank any sediment or other matter that may have accumulated during the filtering operation.

The invention has for further objects other improvements, and consists in certain novel constructions, combinations, and arrangements of parts, as will be hereinafter described, and pointed out in the claim.

In the drawings, Figure 1 is a perspective view of the filter. Figs. 2 and 3 are vertical sections thereof, and Fig. 4 is a top plan view with the lid or cover removed.

The filter has a suitable case A, having the bottom B and the top C, and is divided vertically into inlet-compartment D, filtering-compartment E, and outlet-compartment F, formed by vertical partitions 1, 2, and 3.

The partition 1 extends to the bottom of the casing and separates the inlet and outlet compartments at their lower ends, so that water cannot pass from the inlet to the outlet except through the filtering medium. The partition 2 terminates at its lower end a short distance above the bottom B, forming a passage for the water from the lower end of the inlet-compartment to the lower end of the filtering-compartment, the partition 3, like partition 1, extending to the bottom of the casing and preventing water passing from the filtering-compartment directly into the lower end of outlet-compartment, so that water can only enter the upper end of the outlet-compartment, and to do so must pass up through the filtering-compartment, as will be understood from the drawings. These inlet and outlet compartments are arranged side by side, while the filtering-compartment ranges alongside both the other compartments and has its lower end opening into the lower end of the inlet-compartment, so it will receive at its lower end water from the lower end of the inlet-compartment when the inflowing water is passing through the machine and will drain back into the inlet-compartment after the inflow of water has ceased, thus operating to drain the filtering-compartment, the bottom of which inclines downward toward the waste-outlet in the bottom of the inlet-compartment, so the water will freely drain out of such opening when the valve is open.

The filtering-compartment has a lower perforated partition G and an upper perforated partition H. The lower partition is preferably a plate fitting at its curved edge upon the upper end of the inclined bottom of the filtering-compartment and having its other edge resting upon cleats or lugs G' on the upright partition between the filtering and other compartments. This partition also has a ring g, forming a hand-hold by which it may be conveniently lifted from the casing. The upper partition H is supported on suitable lugs or rests h and may be readily removed when desired. The space between these partitions is filled with filtering material of any suitable character desired, and the water entering the inlet-compartment will pass upward through the filtering-compartment and overflowing the same will pass to the outlet-compartment and thence to the cistern or other receptacle, the upper end of the filtering-compartment opening into the outlet-compartment at a considerable distance below the top of the casing, affording ample space for the water to flow from the filtering-compartment into the outlet-compartment. The partitions G and H being readily removable permit the convenient renewal of the filtering medium and a thorough cleansing of the filter.

In the upper part of the inlet-chamber is fitted the bucket I, made sufficiently large to receive the full discharge of water from the downspout or other suitable supply, such bucket being supported on a rod J, which extends through its bottom, the opening at $j$ surrounding such rod being larger than the rod, forming a drip-opening, and a conical screen or sieve $j'$ surrounds the rod within the bucket, tending to prevent the clogging of the drip-opening. The valve K is supported on the lower end of the rod J and fits the valve-seat $k$ surrounding the outlet-opening, which valve-seat may be formed of glass, brass, or other suitable material. The rod J between the valve K and bucket I is guided by a cross guide-plate L having at its ends depending portions or wings L' fitting in keepers $L^2$ in the opposite sides of the inlet-compartment, so the guide L may be conveniently removed with the bucket and valve, affording access to the interior of the inlet-compartment.

The bucket, rod, &c., are supported on one arm of a lever M, pivoted at $m$ to the casing and supporting a counterbalance-weight N on its other arm, the said weight being preferably arranged to operate in the outlet-compartment.

The lever M has its arm supporting the bucket provided with an upwardly-extending arm M', having a notch or seat $M^2$ for the latch O, supported on the top P of the filter, which top may be removably applied in any suitable manner. By this arm arrangement I do away with shut-off in house-pipe, as all other filters need a cut-off in conductor-pipe, allowing house to wash off before letting any water into filter. By this arm you can let first drop of rain go into filter. Where desired, the counterbalance-weight may be formed to serve as a valve to close the discharge-opening of the outlet-compartment. By the latch O the bucket can be held elevated where desired to secure a greater wash-off of the roof than will be given by the simple filling of the bucket.

In operation the first water will flow through the bucket and out through the waste-pipe; but when the bucket fills it will overbalance the weight and lower, depressing the valve and closing the discharge-opening of the inlet-chamber, forcing the incoming water to pass up through the filtering material and into the outlet-compartment and thence to the cistern. When the rain ceases, the bucket will empty and becoming overbalanced will rise, lifting its valve and opening the outlet to the waste-pipe. When this is done, the contents of the filter, including the filtering-compartment, will drain downward, and the drainage passing down the inclined bottom will wash therefrom all sediment and other accumulations which may become deposited during the filtering operation, thus leaving the filter in cleanly condition for the next shower, and will not freeze.

Having thus described my invention, what I claim as new, and desire to secure by Letters Patent, is—

The improvement in filters herein described comprising the casing the partitions dividing it into the inlet, outlet and filtering compartments, the filtering compartment communicating at its lower end with the inlet and at its upper end with the outlet compartment and having an inclined bottom leading downward toward the discharge opening of the inlet compartment, the bucket fitted in the inlet compartment and having the valve and its rod, the guide bar on the rod between the bucket and valve and having depending end portions the keepers on the walls of the inlet compartment receiving said end portions, the lever supporting such bucket having a projecting arm and the latch device engaging such arm all substantially as and for the purposes set forth.

CHAS. ASHURST.

Witnesses:
HENRY SPEARS,
JNO. J. MCCLINTOCK.